United States Patent Office 3,598,543
Patented Aug. 10, 1971

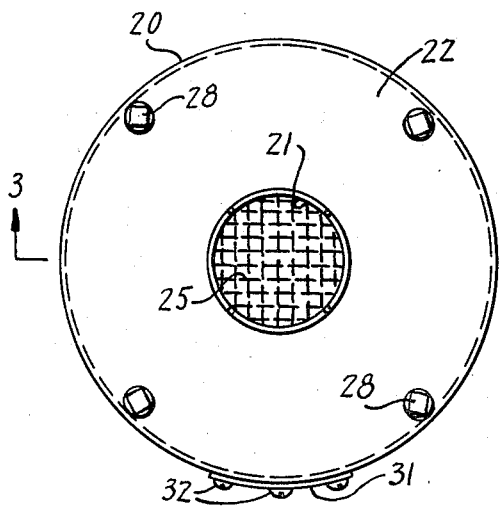
FIG. 2
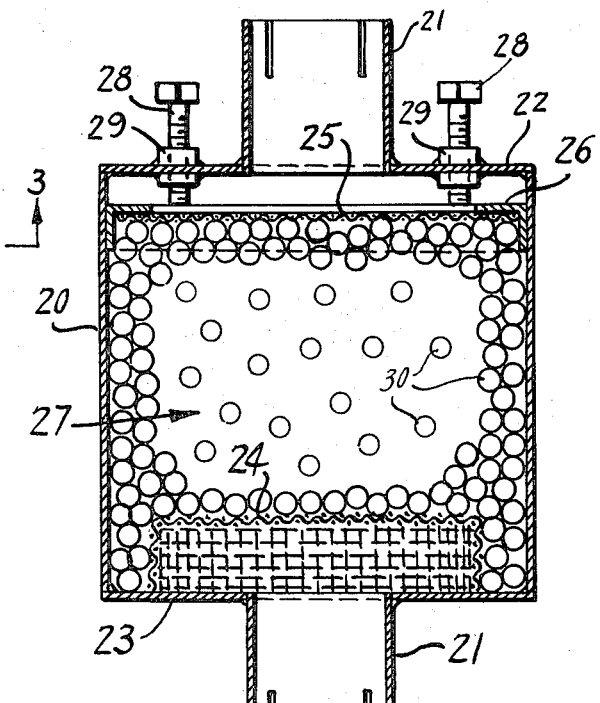
FIG. 3
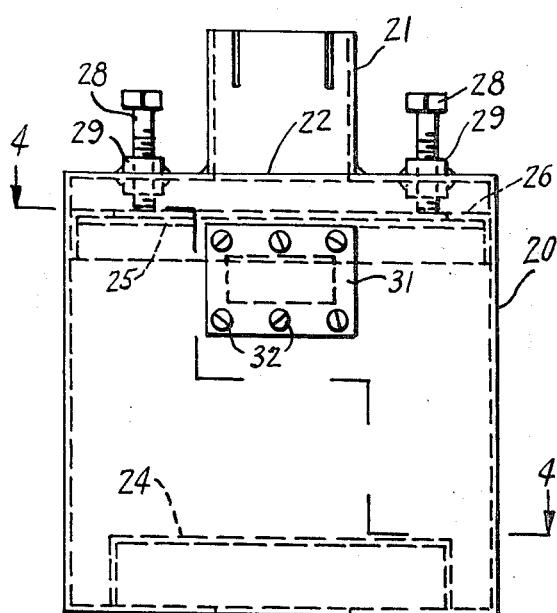
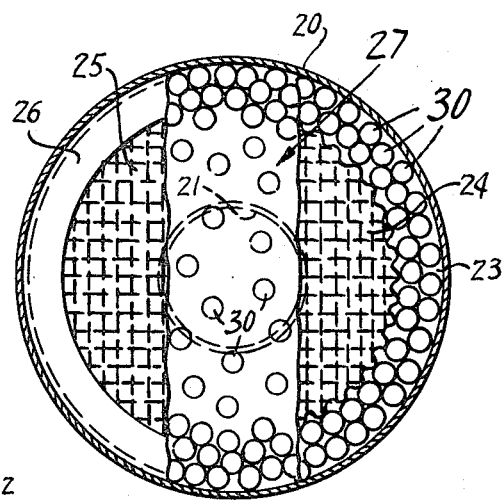
FIG. 4
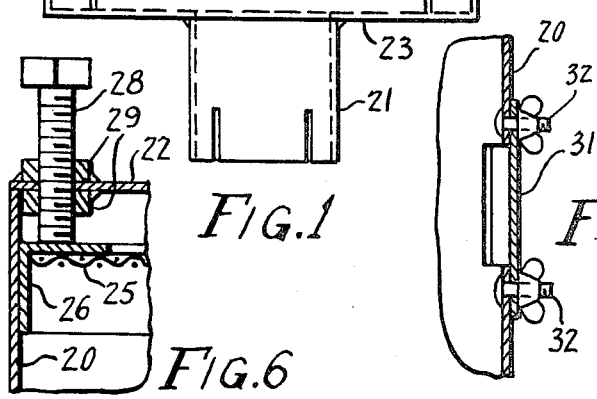
FIG. 1
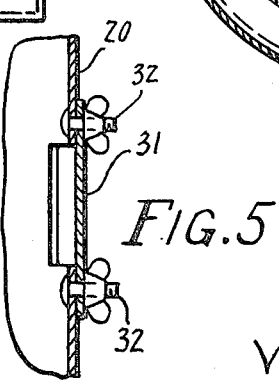
FIG. 5
FIG. 6
INVENTORS.
HOWARD M. CROSBY
HERMAN Z. FORDHAM
BY JOHN H. HENDERSON, JR.
Victor J. Evans & Co.
ATTORNEYS.

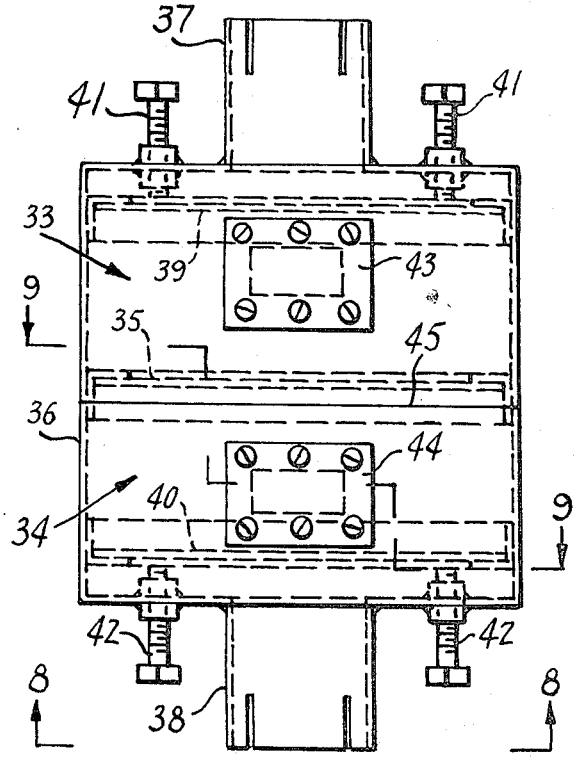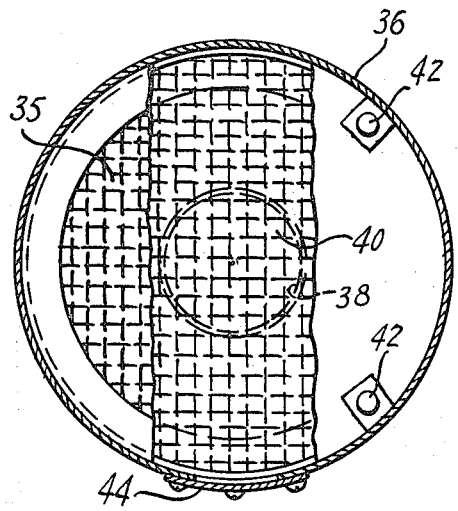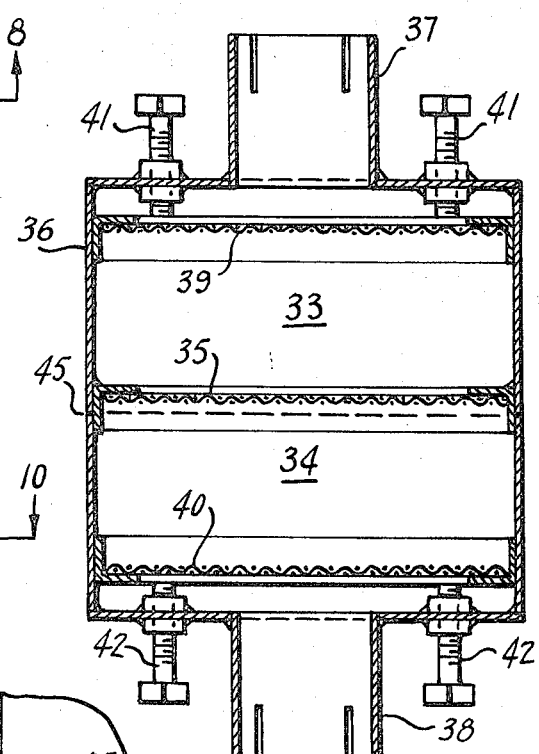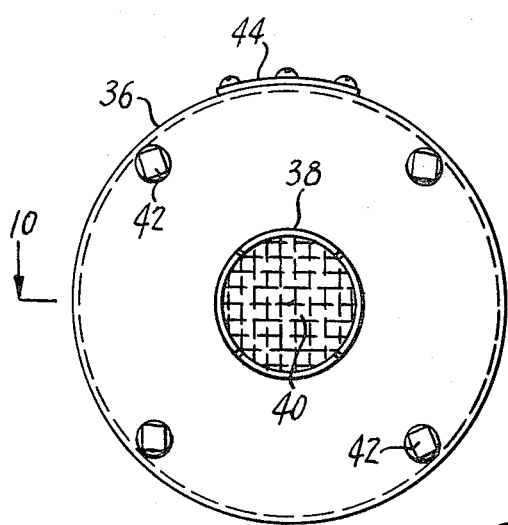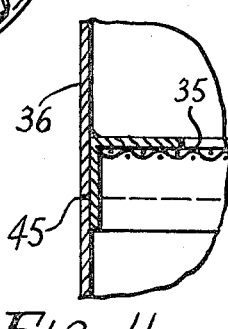

3,598,543
CATALYTIC EXHAUST PURIFIER
Howard M. Crosby, Marietta, Herman Z. Fordham, Atlanta, and John H. Henderson, Jr., Marietta, Ga., assignors to Kleen Air Corporation, Marietta, Ga.
Filed June 25, 1969, Ser. No. 836,433
Int. Cl. F01n 3/14
U.S. Cl. 23—288F
1 Claim

ABSTRACT OF THE DISCLOSURE

A diesel or like exhaust gas purifier or converter consists of a casing connected directly into the exhaust pipe and having a chamber or chambers for preferably high density, low surface area alumina spheres which have been previously impregnated with a catalytic agent such as a platinum salt or a mixture of cobalt and calcium salts or the like. An adjustable foraminous baffle or baffles is provided in the casing so that the alumina spheres may be pressed into contacting relation in a catalytic chamber where exhaust purification occurs as the exhaust gas flows through such chamber.

---

As is well-known, there is a widespread demand for efficient and economical means to purify or render neutral and non-toxic automotive exhaust gases and in particular diesel exhaust gases in the current program to lessen air pollution. Many solutions have been proposed, some practical and some impractical for economic reasons, and thus far no one particular system has proven to be entirely satisfactory or to be adopted on a wide scale basis.

The aim of this invention is to provide a simple and economical catalytic purifier unit or canister for connection directly into the exhaust pipe of the vehicle whereby the exhaust gases from the diesel engine or the like are caused to pass through a compact mass of high density, low surface area alumina spheres impregnated with a suitable catalyst. The high density alumina as manufactured by Aluminum Company of America acts as a heat sink which allows the catalyst to reactivate quickly after a period of non-use. The high density alumina is thus used not only as a support for the catalyst but moreover as a storage bank for heat to enable the catalyst to stay hotter longer during periods of engine shut-down. In the past, activated alumina having a high surface area and a low density has been employed as a support for various catalysts. However, this type of alumina is a very poor holder of heat and the catalyst must be hot to function properly. Consequently, the fast cooling of the high surface area, low density alumina causes quick de-activation of the catalyst whenever the source of heat is removed and therefore it is believed that the employment of high density, low surface area alumina as the catalytic support will add greatly to the efficiency of the exhaust purifier in conjunction with the unique mechanical features thereof, to be disclosed during the course of the following description.

BRIEF DESCRIPTION OF DRAWING FIGURES

FIG. 1 is a side elevation of an exhaust gas purifier unit or canister embodying the invention.

FIG. 2 is an end elevation thereof.

FIG. 3 is a horizontal section taken on line 3—3 of FIG. 2.

FIG. 4 is a transverse vertical section taken on line 4—4 of FIG. 1.

FIG. 5 is an enlarged fragmentary vertical section through a closure plate and associated elements.

FIG. 6 is an enlarged fragmentary vertical section through an adjustable foraminous baffle and associated elements.

FIG. 7 is a side elevational view of an exhaust purifier unit in accordance with a modification of the invention.

FIG. 8 is an end elevation on line 8—8 of FIG. 7.

FIG. 9 is a transverse vertical section taken on line 9—9 of FIG. 7.

FIG. 10 is a horizontal section taken on line 10—10 of FIG. 8.

FIG. 11 is an enlarged fragmentary vertical section through a fixed foraminous center partition and associated elements.

DETAILED DESCRIPTION

Referring to the drawings in detail, wherein like numerals designate like parts, and referring in particular to FIGS. 1 through 6, there is shown a cylindrical container or canister body 20, preferably formed of stainless steel, and having central axial reduced diameter short pipe extensions 21 secured to and opening into the opposite end walls 22 and 23 of the body 20. The canister body is closed except for the axial through passage afforded by the pipe extensions 21, which are adapted to be coupled directly into the exhaust pipe of a truck or other automotive vehicle.

Secured to the downstream end wall 23 in surrounding relation to the pipe extension 21 is a cylindrical cuplike screen 24, preferably formed of stainless steel wire mesh, and having its interior end wall spaced appreciably from the end wall 23 and its side wall arranged concentrically with the side wall of the body 20 and with the pipe extension 21. Near the opposite end of the canister body is an axially adjustable foraminous partition or barrier 25 having a rigid marginal ring 26 fitting closely and slidably in the bore of the canister body 20. The partition 25 is also preferably formed of sturdy stainless steel wire mesh.

The chamber 27 within the canister body between the elements 24 and 25 is filled with high density, low surface area alumina spheres which are impregnated with a suitable catalyst. A number of satisfactory catalysts are known. One suitable catalyst and its processing is the following, as an example:

List of ingredients ------ Cobalt nitrate, calcium nitrate alumina spheres, F–110 Alcoa, ¼" dia.

Relative proportions in preparation ---------- 20% soln of $Ca(NO_3)_2$, 20% soln of $Co(NO_3)_2$.

Relative proportions in final catalyst --------- 10–20% $Co_3O_4$, 5–10% CaO, 70–80% alumina.

Method of compounding-- Impregnate hot 300° C. alumina spheres 1–4 hrs. in $Ca(NO_3)_2$ soln. Dry to 0.1% moisture 110° C. and calcine at 600° C. 2 hrs. While still hot impregnate in $Co(NO_3)_2$ 1 hr. Dry in oven at 110° C. till 0.1% moisture remains and calcining at 600° C. for 2 hrs.

When the chamber 27 is thus filled with the alumina spheres, the latter are compressed firmly or packed by shifting the foraminous partition 25 toward the cup-like screen 24. For this purpose, a plurality of pressure screws 28 are mounted within nuts 29 on the upstream end wall 22 near and inwardly of the side wall of canister body 20, whereby the inner ends of the screws will abut the marginal ring 26 carrying the partition 25. By tightening the several screws 28, the mass of alumina spheres 30 impregnated with a catalyst may be tightly packed, as is desirable. As stated previously, the spheres are preferably high density, low surface area alumina spheres which have the ability to hold heat for long periods of time. Consequently, during periods of engine shut-down, the spheres remain hot to a great extent and this allows the catalyst to re-activate quickly when the engine is re-started, for more effective exhaust purification.

A closure plate 31 with suitable fasteners 32 is provided on the side wall of the canister body 20 near the upstream end thereof to facilitate the placement of the spheres 30 in the chamber 27 at necessary times.

When the device is coupled within an exhaust pipe, the exhaust gases are caused to flow axially through the canister from the upstream pipe extension 21 to the downstream extension. In so doing, the gases are compelled to pass through the screen 25 and to intermingle with the catalyst impregnated spheres 30 in the chamber 27 before passing through the screen 24 and out through downstream pipe extension 21 in a purified state due to the action of the particular catalyst.

FIGS. 7 through 11 of the drawings show a modification of the invention which differs from the embodiment in FIGS. 1-6 only in that a pair of separated chambers 33 and 34 for separate masses of catalyst impregnated alumina spheres are formed on opposite sides of a fixed central foraminous partition 35 at the longitudinal center of the cylindrical canister body 36. Upstream and downstream pipe extensions 37 and 38 are provided exactly as previously described and two axially shiftable foraminous screens 39 and 40 are provided within the canister, each being engaged by a set of adjusting screws 41 and 42, as shown, whereby the two screens 39 and 40 are individually shiftable toward the fixed center screen or partition 35 to trap and compress the alumina spheres in the chambers 33 and 34. Two separate closure plates 43 and 44 are provided on the body 36 to permit access to the individual chambers 33 and 34. In all other respects, the unit is identical to the one shown and described in FIGS. 1 through 6 and the mode of operation of the device is unchanged. The arrangement in FIGS. 7-11 simply renders the unit somewhat more versatile as to its adjustability. The cylindrical canister 36 may, if desired, be formed in two opposing sections joined on a parting line 45.

We claim:

1. An exhaust purified device comprising a canister body adapted to be connected directly into an exhaust pipe and having a purifying chamber, a multiplicity of high density low surface area alumina elements impregnated with a catalyst packed into said chamber in the flow path of exhaust gas passing therethrough, said alumina elements serving simultaneously to support the catalyst and to form a heat sink enabling quick reactivation of the catalyst after periods of engine shut-down, said canister body having inlet and outlet ends for exhaust gas, a fixed raised foraminous partition encircling and covering the outlet of said outlet end forming an annular space within said body along the height of said partition outside thereof and a cylindrical outlet space of greater diameter than said outlet surrounded by said annular space, an opposing adjustable foraminous partition within said chamber, guide means transverse with said opposing partition, and threaded means solely at selected times making physical contact with said opposing partition pressing desired portions of said opposing partition against said alumina elements for packing said annular space at all points therein.

References Cited

UNITED STATES PATENTS

| | | | |
|---|---|---|---|
| 991,861 | 5/1911 | Lemberg | 23—288.3 |
| 1,422,211 | 7/1922 | Lamb | 23—288.3 |
| 3,094,394 | 6/1963 | Innes | 23—288.3 |
| 3,189,418 | 6/1965 | Gary | 60—30 |
| 3,247,665 | 4/1966 | Behrens | 60—29 |

DOUGLAS HART, Primary Examiner

U.S. Cl. X.R.

60—29